(12) United States Patent
Lack et al.

(10) Patent No.: US 6,447,373 B1
(45) Date of Patent: Sep. 10, 2002

(54) CHEMICAL MECHANICAL POLISHING SLURRIES FOR METAL

(75) Inventors: Craig D. Lack, Wilmington; Qiuliang Luo, Newark; Qianqiu (Christine) Ye, Wilmington; Vikas Sachan, Hockessin; Terence M. Thomas, Newark, all of DE (US); Peter A. Burke, Avondale, PA (US)

(73) Assignee: Rodel Holdings Inc., Wilmington, DE (US)

( * ) Notice: Subject to any disclaimer, the term of this patent is extended or adjusted under 35 U.S.C. 154(b) by 0 days.

(21) Appl. No.: 09/598,377

(22) Filed: Jun. 21, 2000

Related U.S. Application Data (60) Provisional application No. 60/142,326, filed on Jul. 3, 1999.

(51) Int. Cl.$^7$ ................................................ B24B 1/00
(52) U.S. Cl. ............................ 451/41; 451/60; 451/36; 51/308
(58) Field of Search .............................. 451/60, 28, 36, 451/41; 156/153, 258, 344, 345; 51/295, 307, 308

(56) References Cited

U.S. PATENT DOCUMENTS

| | | |
|---|---|---|
| 5,078,801 A * | 1/1992 | Malik .......................... 451/287 |
| 5,527,423 A | 6/1996 | Neville et al. |
| 5,603,739 A | 2/1997 | Neuland |
| 5,692,950 A | 12/1997 | Rutherford et al. |
| 5,738,695 A * | 4/1998 | Harmer et al. ................. 451/28 |
| 5,773,364 A | 6/1998 | Farkas et al. |
| 5,904,159 A * | 5/1999 | Kato et al. ..................... 451/38 |
| 5,954,997 A | 9/1999 | Kaufman et al. |
| 6,022,400 A * | 2/2000 | Izumi et al. ................... 451/28 |
| 6,037,260 A | 3/2000 | Tsai et al. |
| 6,110,396 A | 8/2000 | Ronay |
| 6,162,268 A * | 12/2000 | Knapp et al. .................. 451/36 |
| 6,217,416 B1 * | 4/2001 | Kaufman et al. .............. 451/41 |
| 6,270,395 B1 * | 8/2001 | Towery et al. ................. 451/28 |

* cited by examiner

*Primary Examiner*—Joseph J. Hail, III
*Assistant Examiner*—Hadi Shakeri
(74) *Attorney, Agent, or Firm*—Kenneth A. Benson; Konrad Kaeding; Gerald K. Kita (57) ABSTRACT

A slurry for use in chemical-mechanical polishing of a metal layer comprising particles dispersed in an aqueous medium. The slurry particles will tend to agglomerate when the slurry is at rest and will de-agglomerate with simple stirring. Such metastable slurry systems have been found to be particularly advantageous for metal polishing, particularly the polishing of metal layers during the manufacture of semiconductor devices.

31 Claims, 6 Drawing Sheets

Prior Art

Fig. 5a
Magnification
360,000X

Fig. 5b
Magnification
360,000X

FIG. 6

CHEMICAL MECHANICAL POLISHING SLURRIES FOR METAL

This application claims the benefit of US Provisional Application Serial No. 60/142,326 filed Jul. 3, 1999.

FIELD OF THE INVENTION

The present invention relates generally to chemical-mechanical polishing slurries for metal, preferably for use in semiconductor device planarization, memory disk polishing, (metal containing) optics polishing, and the like. More particularly, the slurries of the present invention are preferably designed to have a low static etch rate and are preferably metastable due to reversible formation of certain types of agglomerates.

DISCUSSION OF THE PRIOR ART

Many prior art slurries tend to agglomerate over time and form hard, dense sediment, and this problem is well discussed in U.S. Pat. No. 5,527,423 to Neville, et al. (hereafter, "Neville"), which is hereby incorporated into this specification by reference.

The Neville patent addresses this problem by having the slurry comprise "a force sufficient to repel and overcome the van der Waals forces between the particles," (a fundamental element of all the Neville claims). To date, the solution provided in the Neville patent has had little, if any, commercial success.

Applicant has found a novel solution to the problem of the Neville patent, and surprisingly, it requires the absence of "a force sufficient to repel and overcome the van der Waals forces between the particles". Hence, the present invention is quite contrary to the teachings of Neville. Applicant's invention takes metal slurry technology to a much higher performance level than what is discussed and described in the Neville patent.

SUMMARY OF THE INVENTION

The present invention is directed to a chemical mechanical polishing slurry for polishing metal layers, comprising metal oxide particles dispersible in an aqueous medium. The particles have a surface area ranging from about 40 $m^2/g$ to about 430 $m^2/g$, and an aggregate size distribution less than about 1.0 micron, a mean aggregate diameter less than about 0.4 micron. The slurries of the present invention will form agglomerates of sizes in excess of 0.75 microns (and in certain other embodiments, agglomerates greater than 1 micron and 1.25 microns). In a preferred embodiment of the present invention, the agglomerates will not cause unacceptable polishing defects and will generally de-agglomerate with simple agitation.

Whereas slurries in accordance with Neville are "colloidally stable", the slurries of the present invention are not "colloidally stable". Rather, the slurries of the present invention exhibit a type of metastability. When a slurry is agitated into a uniform dispersion, then placed at rest, a stable slurry (i.e., slurries in accordance with the Neville patent) will tend to stay uniformly dispersed. Perhaps a very thin line of decantant might form at the very top of the slurry after several days or so, but fundamentally the particles generally remain well dispersed throughout at least 90% of the slurry, even after being at rest for more than two weeks.

On the other hand, the metastable slurries of the present invention will immediately start to fall out of suspension when at rest. Typically within a few hours (of being at rest), a large line of decantant will tend to form at the top of the slurry. Within 48 hours (of being at rest), as much as 80% or more of the slurry particles will tend to be located in the bottom two thirds of the slurry, and after being at rest for more than two weeks, the slurries of the present invention will generally have over 80% of the slurry particles located in the bottom half of the slurry.

The slurries of the present invention are NOT unstable, but rather, a type of metastable, wherein the particles will agglomerate and fall out of suspension when the slurry is at rest, but then, will immediately de-agglomerate and redisperse with simple agitation. In comparison, an unstable slurry will NOT readily de-agglomerate and redisperse with simple agitation, because unstable slurries will form stage 2 agglomerates (stage 1 and stage 2 agglomeration is further defined below).

Agglomerates have generally been considered undesirable for polishing. However, agglomeration occurs in two stages, and Applicant has discovered that only stage 2 agglomeration causes the predominant undesirable effects upon chemical mechanical polishing performance. The metastable slurries of the present invention will generally not form stage 2 agglomerates, but rather will substantially only form stage 1 agglomerates. Unlike stage 2 agglomerates, stage 1 agglomerates will readily de-agglomerate with simple agitation (e.g., vigorous shaking of the slurry for about 5 seconds or less).

Stage 1 agglomeration involves agglomerated particles held together primarily by van der Waal forces. Stage 2 agglomeration can occur after stage 1 agglomeration, wherein the particles then fuse together over time, causing the particles to be primarily held together not by van der Waal forces, but rather covalent (or similar-type high energy) bonding between the particles. The slurries of the present invention comprise an appropriate amount of ionic species and/or other adjuvants which diminish or otherwise prevent stage 2 agglomeration.

The ionic species used in the present invention are adjusted to diminish, inhibit or otherwise disrupt any charge layer around each particle in the slurry. For example, the anionic species in the aqueous medium will interact with, diminish or otherwise disrupt any positively charged layer around any particle, and the cationic species in the aqueous medium will interact with, diminish or otherwise disrupt any negatively charged layer around any particle.

This disruption of any charge layer around each particle substantially removes or diminishes electrostatic repulsion between particles. Such diminished electrostatic repulsion de-stabilizes the slurry and enables the particles to move sufficiently close to one another to induce a van der Waals bond between the particles, thereby creating stage 1 agglomerates. Stage 1 agglomeration may also involve hydrogen bonding between particles. A critical feature of the present invention is the absence of a force sufficient to repel and overcome the van der Waals forces between the particles, and therefore the slurries of the present invention will (when at rest) readily form stage 1 agglomerates and (partially or wholly) fall out of suspension.

During agglomeration, particles are able to move sufficiently close to one another to induce van der Waals bonds, and these bonds bias the particles together. While the particle are biased together by van der Waals forces, a second stage of agglomeration can then occur. This second stage involves bridging between the particles. Bridging occurs due to the equilibrium reactions between the particle surface and the aqueous medium surrounding the particles.

The surface of the particle will tend to dissolve into the aqueous medium, then precipitate onto the particle(s). When the precipitate bridges between two particles, thereby covalently bonding the particles together, this becomes stage 2 agglomeration.

For example, although alpha alumina is generally inert (i.e., tends to resist dissolving) in an aqueous medium, conventional alpha alumina has about 1 weight percent (or more) of gamma alumina. The gamma alumina is far less inert in an aqueous medium and will typically (reversibly) dissolve, creating $AlO_2^-$ in a basic medium and $Al^{+3}$ in an acidic medium. In either case, the reaction is reversible and the ions which dissolve from the particle will re-deposit back onto the particle(s).

When van der Waal forces bias two particles together, this re-depositing (of the dissolved alumina back onto the particles) can cause bridging between the two particles. Indeed, by dissolving and re-forming, the two particles tend to slowly fuse together into a single rigid mass. Over time, the agglomerates will be so rigidly fused together that a hard dense sediment (of stage 2 agglomerates) is formed. Stage 2 agglomerates generally cannot be effectively broken down into their original particles, except by the application of high energy, e.g., milling or high shear mixing.

Applicants have discovered that only this bridging (stage 2 agglomeration) is harmful to the polishing performance of a metal slurry. Applicant has further discovered that if such bridging is inhibited or wholly prevented, dramatically improved polishing performance can occur, even if the particles undergo stage 1 agglomeration (i.e., agglomeration substantially free of bridging) due to van der Waal forces between particles. This is preferably done by adjusting the slurry chemistry to obtain the desired state, e.g., an optimal ionic strength.

Without bridging, agglomerated particles will readily de-agglomerate with minimal agitation. Indeed, van der Waal forces are extremely weak, arguably the weakest forces which can exist between two separate bodies of matter. Without bridging, these van der Waal forces (and any hydrogen bonding between the particles) are easily overcome, and any agglomeration is not detrimental to polishing. Agglomeration without bridging will generally cause a slurry to form a fluffy "cloud" or layer toward the bottom of a slurry container, once left undisturbed for a period of time. With only minimal agitation, the cloud of agglomerates readily breaks apart and re-disperses in the medium. Typically, vigorous shaking of the container for less than a minute (more preferably less than 30 seconds, yet more preferably less than 15 seconds and yet more preferably in less than 5 seconds) will de-agglomerate the slurries of the present invention and cause the particles to uniformly disperse within the aqueous medium.

A further critical feature of the present invention is the inhibition or prevention of stage 2 agglomeration, after stage 1 agglomeration. This is accomplished by the incorporation of appropriate ionic species or other adjuvants which inhibit the fusing of stage 1 agglomerated particles into stage 2 agglomerated particles.

In a preferred embodiment, stage 2 agglomeration is inhibited by coating particles with a surfactant or polyelectrolyte prior to incorporating the particles into a slurry system. Alternatively, the surfactant or polyelectrolyte can be incorporated onto the particles after the particles are incorporated into the slurry system. The surfactant and/or polyelectrolyte will tend to remain in close proximity to the slurry particles, thereby sterically hindering the particles from coming sufficiently close to one another to enable bridging or stage 2 agglomeration. It has been surprisingly discovered that stage 1 agglomeration can occur even in the presence of surfactant or polyelectrolyte at the surface of the particles, and that the presence of the surfactant or polyelectrolyte will keep the particles sufficiently apart to inhibit or prevent stage 2 agglomeration.

Stage 2 agglomeration can also be inhibited by the use of complexing agents which inhibit deposition or sedimentation from the aqueous medium onto the agglomerated particles. Useful complexing agents include appropriate chelating compounds, ordinary skill and experimentation may be necessary in choosing appropriate chelating agents, depending upon the type of potential sedimentation or deposition for any particular slurry system. Generally speaking, water soluble, polar organic compounds having one or more (preferably two or more) Lewis acid moieties can be advantageous as complexing agents in accordance with the present invention. Preferred complexing agents include multifunctional acid or acid-hydroxide, water soluble organic compounds, such as, citric acid.

Stage 2 agglomeration can also be inhibited by modifying the solubility of "potential bridging" materials in the slurry (material in the slurry which is capable of deposition or sedimentation). Possible modifications may include pH modification, temperature modification, ionic strength modification and the like. Ordinary skill and experimentation may be necessary to determine the appropriate modification, depending upon the particular slurry system selected.

Sonification is a method that can be used to determine whether agglomerates are stage 1 agglomerates (stage 1 agglomerates are agglomerates which are held together primarily only by Van der Waal forces, e.g., no bridging) or stage 2 agglomerates (stage 2 agglomerates are agglomerates which are held together by Van der Waal forces and also by bridging). Generally speaking conventional, low energy sonification will break up stage 1 agglomerates but not stage 2 agglomerates. Any agglomeration of the present invention (due to the slurry being at rest for a period of time, e.g., 2 hours or more) is principally stage 1 agglomeration. Hence, the agglomerated particles of the present invention are de-agglomerated by sonification. De-agglomeration can be measured by taking a particle size distribution before and after sonification. After sonification, the size distribution should shift, thereby showing smaller particles. Thereafter, the slurry (when at rest) will tend to once again (stage 1) agglomerate.

The stage 1 agglomerates of the present invention are stable, and stable is intended to mean that the stage 1 agglomerates will resist stage 2 agglomeration for a period of at least 3 months. Preferably, less than 15 percent (by volume) of the stage 1 agglomerates will become stage 2 agglomerates when at rest for 3 months, more preferably less than 10 percent, yet more preferably less than 5 percent, yet more preferably less than 2 percent and yet more preferably less than 1 percent of the stage 1 agglomerates will become stage 2 agglomerates when at rest for 3 months.

Applicants have found that particles capable of providing stage 1 agglomeration (without also causing stage 2 agglomeration) provide a superior metal polishing slurry relative to slurries having a force sufficient to repel and overcome the van der Waals forces between the particles, e.g., do not agglomerate. Hence, Applicants have found that agglomeration is not the problem, but rather bridging (e.g., the formation of hard, dense sediment) is what harms slurry performance. Not only can agglomerating slurries function well as a metal polishing slurry, but indeed, a slurry system which enables particle agglomeration without bridging has been found to surprisingly provide improved polishing performance, particularly in the polishing of metal layers as part of the manufacture of semiconductor devices.

Applicants have found that improved planarization length and diminished dishing is possible with polishing slurries having stage 1 agglomerates. It is believed that stage 1 agglomerates will tend to settle into indentations in the substrate being polished, but will readily de-agglomerate or otherwise wear (without scratching) during the polishing operation, thereby protecting the indentation from further polishing erosion by preventing the polishing operation from entering (and then increasing) the indentation.

Part of this advantageous behavior (of filling in indentations) is believed to be due to the lack of (or a diminished amount of) a charge density around the particles. After polishing, the stage 1 agglomerates are easily washed away, particularly when the ionic strength of the aqueous medium is changed to thereby re-normalize the electrostatic charge on the particles, thereby making the particles less compatible with being located within the indentation. Hence the slurries of the present invention provide stage 1 agglomerates that readily fill indentations when is it advantageous to do so and are readily removed from the polished surface when it is advantageous to do so. This type of selective filling and unfilling of indentations is very unique and allows superior planarization polishing over conventional metal slurries.

Stage 1 particle agglomerates generally have diminished electrostatic layer(s) and such particles tend to provide improved polishing by better interacting with the surface chemistry of a polishing substrate. Furthermore, the ionic species which inhibit or destroy electrostatic layers (around the particles) are preferably selected to provide other polishing advantages. For example, an ionic species can be used to buffer pH, provide a complexing agent to other ions in suspension (inhibit re-deposition), and/or provide selectivity (certain ionic species may protect portions of a surface, so that other portions of the surface will exhibit a higher removal rate).

Ionic species such as acids, bases, salts, complexing agents, surfactants, electrolytes, and the like are all well known, and indeed, such ionic species are, broadly speaking, known for chemical mechanical polishing. However, it has been surprisingly discovered that when an appropriate level of ionic species is introduced into a polishing slurry (e.g., where the aqueous medium has a sufficiently ionic strength), polishing performance of the slurry can be improved and unwanted particle bridging can be substantially inhibited. In a preferred embodiment, the slurry's total ion concentration is greater than 0.001 molar, more preferably greater than 0.01 molar, yet more preferably greater than 0.05 molar, yet more preferably greater than 0.1 molar, yet more preferably greater than about 0.2 molar and yet more preferably greater than about 0.5 molar. In a preferred embodiment, the total ion concentration is also less than 2 molar, more preferably less than 1 molar. In a preferred embodiment, the metal oxide particles also have a maximum zeta potential greater than about plus or minus 0.10 millivolts in an aqueous medium having an ion concentration of less than 0.001 molar.

The slurries of the present invention are particularly well suited for polishing operations having high polishing surface speeds. For example, many newer polishing machines are polishing at increasingly higher revolutions per minute, and the slurries of the present invention are particularly well suited for such high speed polishing (e.g., rotary polishing speeds greater than 100 rpm, greater than 150 rpm and/or greater than 200 rpm).

The slurries of the present invention are also well suited for polishing dielectrics (silica), including low k dielectrics, such as porous silica, or organic low k dielectrics, such as fluoro polymers or copolymers.

In a preferred embodiment, any stage 1 agglomerate transported onto the polishing interface or region will de-agglomerate or otherwise wear, rather than scratch or otherwise cause defects on the surface being polished.

In another embodiment of the present invention, the ionic strength of the slurry is adjusted after the polishing operation, thereby restoring (or increasing) the electrostatic layers around each particle. This in turn will generally cause the particles to be more easily cleaned or otherwise removed from the polished surface.

The present invention is particularly advantageous for fumed particles, since fumed particles generally have more potential sites for stage 2 agglomeration.

The slurries of the present invention comprise constituents which not only inhibit or prevent stage 2 agglomeration, but also, are sufficiently benign to the metal surface being polished to have a static metal etch rate of less than 50 Angstroms per minute, more preferably less than 40 Angstroms per minute, yet more preferably less than 30 Angstroms per minute, yet more preferably less than 20 Angstroms per minute and yet more preferably less than 10 Angstroms per minute (up to and including 0 Angstroms per minute).

The polishing compositions of the present invention can be created before or during the polishing operation. If created during a polishing operation, the polishing fluid can be introduced into a polishing interface and then some or all of the particles can be introduced into the polishing interface by means of particle release from a polishing pad. For example, a polishing pad type substrate comprising particles is described in U.S. Pat. No. 5,692,950 to Rutherford, et al. (which is hereby incorporated into this specification by reference), and in the use of such a polishing substrate during polishing, the polishing substrate will release particles, into the polishing interface which also contains a polishing fluid. As the polishing fluid and particles mix (in accordance with the present invention), they become a metastable polishing slurry, whereby the slurry will be capable of forming stage 1 agglomerates without substantial formation of stage 2 agglomerates.

DETAILED DESCRIPTION OF THE INVENTION

The present invention is directed to a chemical mechanical polishing slurry comprising ceramic particles dispersible in an aqueous medium. The particles of the present invention have a surface area ranging from about 40 $m^2/g$ to about 430 $m^2/g$, an aggregate size distribution less than about 1.0 micron, a mean aggregate diameter less than about 0.4 micron and are substantially devoid of a force sufficient to repel and overcome the van der Waals forces between the particles. At rest, the slurries of the present invention will readily form stage 1 agglomerates of a size greater than about 0.75 microns, and in other embodiments, the stage 1 agglomerates are greater than about 1 micron, and sometimes greater than 1.25 microns; however, all the slurries of the present invention will resist formation of stage 2 agglomerates.

In the art of chemical mechanical polishing slurries for use in fabricating semiconductor devices and similar-type substrates, slurry particle behavior is generally influenced by atomic and molecular level force interactions. These force interactions are due to induced and/or permanent polarities created in particle molecules by the electric fields of neighboring molecules or due to the instantaneous dipoles caused by the positions of the electrons around the nuclei.

These forces therefore consist of three major categories: 1. Keesom interactions are "permanent dipole to permanent dipole" interactions; 2. Debye interactions are "permanent dipole to induced dipole" interactions; and 3. London interactions are "induced dipole to induced dipole" interactions. The three are known collectively as the van der Waals interactions and play a major role on the behavior of slurry particles, particularly with respect to colloidal stability.

Van der Waal forces are generally attractive and will begin to have significant influence on particles, once the particles move to within about 0.2 to about 10 nanometers of one another. Agitation, heat or other forces upon the slurry will generally cause the slurry particles to move within the aqueous medium, such as by Brownian motion. At greater distances however, the van der Waal forces are generally not significant to particle behavior. Hence, if the particles can be prevented from moving sufficiently close to one another, then van der Waal forces will not have sufficient influence upon the particles to cause them to come together (hereafter referred to as particle agglomeration).

Particles can be biased apart a distance sufficient to make the van der Waal forces between the particles insignificant, typically by: 1. steric hinderance of the particles, which occurs when another non-interacting material comes between the particles and prevents the particles from moving sufficiently close to one another; and/or 2. electrostatic repulsion between the particles, which occurs when the particles each carry an identical charge, and since like charges repel one another, such an identical electrostatic charge on the two particles will cause the particles to repel from one another, such an identical electrostatic charge on the two particles will cause the particles to repel from one another.

Therefore, in the technical art of slurries, there are forces which bias particles away from another ("same charge" electrostatic interactions and steric hinderance interactions) and forces which bias particles toward each other (van der Waals forces). These competing forces can be analyzed in terms of the potential energy of the interacting particles as a function of the distance separating them.

Figure 1:
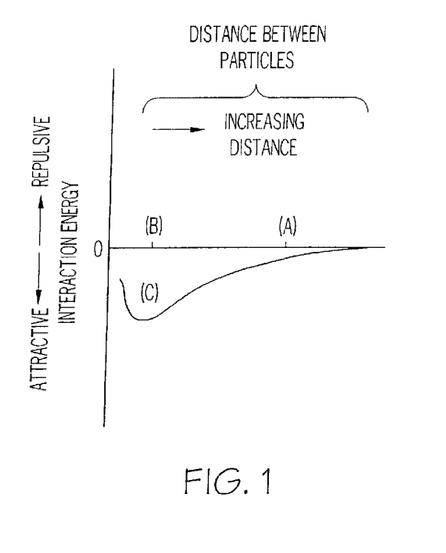
FIG. 1 is a potential energy curve, illustrating the interaction of colloidal particles in an unstable slurry.
Figure 2:
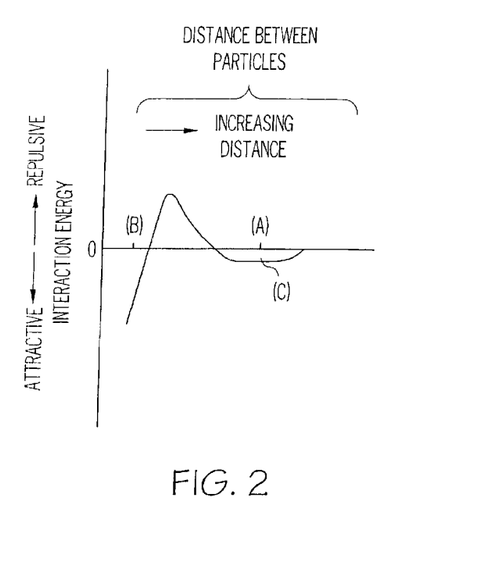
FIG. 2 is a potential energy curve, illustrating the interaction of colloidal particles in a metastable slurry of the present invention.
Figure 3:
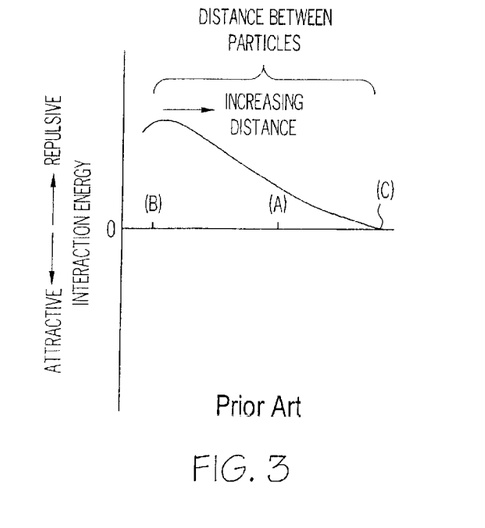
FIG. 3 is a potential energy curve, illustrating the interaction of colloidal particles in a stable slurry as taught in the prior art.

FIGS. 1, 2 and 3 illustrate three possible types of slurry, depending upon the relative repulsive and attractive potential energy as a function of distance between the particles. In each of these Figures, when the interactional energy is 0, the particles are not experiencing any repulsive energy or any attractive energy. As the interaction energy becomes more positive (i.e., moving up the vertical axis), the repulsion energy increases. Similarly, as the interaction energy becomes more negative, the attractive energy increases.

In each figure, the attractive and repulsive potential energies are calculated together to provide an overall potential energy for the slurry system. This overall potential energy is shown by a solid line as a function of separation distance between slurry particles. In each figure, the horizontal axis extends to a distance between particles where van der Waal forces first become significant. At particle separation distances that indicate a net repulsive energy between particles, the line is above the horizontal axis (the further above the horizontal axis, the greater the repulsive energy), and similarly, at particle separation distances that indicate a net attractive energy between particles, the line is above the horizontal axis (the further above the horizontal axis, the greater the attractive energy).

In interpreting FIGS. 1–3, it is important to understand that each slurry system will attempt to exist in the lowest energy state available. Generally speaking, this means that the separation distance of the particles will tend to concentrate where the solid line indicates a trough. If enough energy is inserted into the system to allow the particles to overcome an energy hump and find a new trough, particle distances will then tend to concentrate at such other trough, unless or until further energy is introduced into the system to get the particle back over the prior energy hump and into the prior trough (or otherwise move to a different trough).

There are two important particle separation distances indicated on all three FIGS. (1–3). The first is distance marked "(a)" which is the particle separation distance in which stage 1 agglomeration will begin to occur. Such agglomeration will increasingly tend to occur at smaller distances than (a), until a lower limit is met. For purposes of this invention, this lower limit is not important and is not identified on the Figures.

The second important particle separation distance is "(b)" and this is the particle separation distance in which stage 2 agglomeration will begin to occur. Such (stage 2) agglomeration will increasingly tend to occur at smaller distances than (b), until a lower limit is met. For purposes of this invention, this lower limit is not important and is not identified on the Figures.

Looking now to FIG. 1, particles will tend to concentrate at particle separation distance indicated at the trough (which is illustrated at "(c)") of the curve, and at this particle separation, stage 2 agglomeration will occur. Such a system is clearly unstable, and slurries in accordance with FIG. 1 will readily fall out of suspension and over time will exhibit a hard dense sediment. The non-stable slurries illustrated by FIG. 1 generally have little, if any, electrostatic repulsion or steric hinderance to inhibit agglomeration.

Moving now to FIG. 2, this Figure illustrates the metastable slurries of the present invention. Particles will tend to concentrate at a particle separation distance indicated at the trough (which is illustrated at "(c)"). This particle separation distance is preferred by the system, because the slurries of the present invention do not have forces sufficient to overcome van der Waal forces and hence there is no significant energy barrier to prevent the particles from having a particle separation distance of (c). At this particle separation distance, stage 2 agglomeration can occur, but not stage 1 agglomeration. Furthermore, very little energy would be necessary to increase the particle separation distance (de-agglomerate the slurry). On the other hand, overwhelming energy would be necessary to cause the particle separation distance to be sufficiently small to allow for stage 2 agglomeration. This high energy barrier (hump) which prevents stage 2 agglomeration is due to steric interactions which inhibit particles from moving closely together, e.g., coating the particles with a surfactant and/or electrolyte.

Moving now to FIG. 3, this Figure illustrates a stable slurry system, such as is taught in the Neville patent. In such a system, there is a force sufficient to inhibit van der Waal attraction and hence, the particle separation distance will tend to concentrate at "(c)" where neither stage 1 nor stage 2 agglomeration can occur. The barrier to agglomeration for the stable slurries illustrated in FIG. 3 is typically electrostatic repulsion between particles.

The surface area of the particles can be measured by the nitrogen adsorption method of S. Brunauer, P. H. Emmet, and I. Teller, J. Am. Chemical Society, Volume 60, Page 309 (1938) and commonly referred to as BET, typically ranges from about 40 $m^2/g$ to about 430 $m^2/g$. The particles may comprise between 0.5% and 55% of the slurry depending on the degree of abrasion required. The abrasion of the metal oxide particles, in turn, is a function of the particle composition, the degree of crystallinity and the crystalline phase, e.g. gamma or alpha for alumina. In order to achieve the desired selectivity and polishing rate, it has been found that the optimum surface area and loading level will vary depending upon which fine metal oxide particles are chosen for a particular polishing slurry, as well as the degree of crystallinity and phase of the particles.

In one embodiment when a high degree of selectivity is desired, solid loadings of less than 12% by weight for alumina particles having surface areas ranging from about 70 $m^2/g$ to about 170 $m^2/g$ is preferred. At lower surface areas, i.e. less than 70 $m^2/g$, solid loadings of less than 7% is preferred for alumina particles. Similarly when a low selectivity is desired, it has been discovered that when the fine metal oxide particle is fumed silica, surface areas ranging between 40 $m^2/g$ and 250 $m^2/g$ should be present in a range from about 0.5% to about 20% by weight.

Figure 4A:
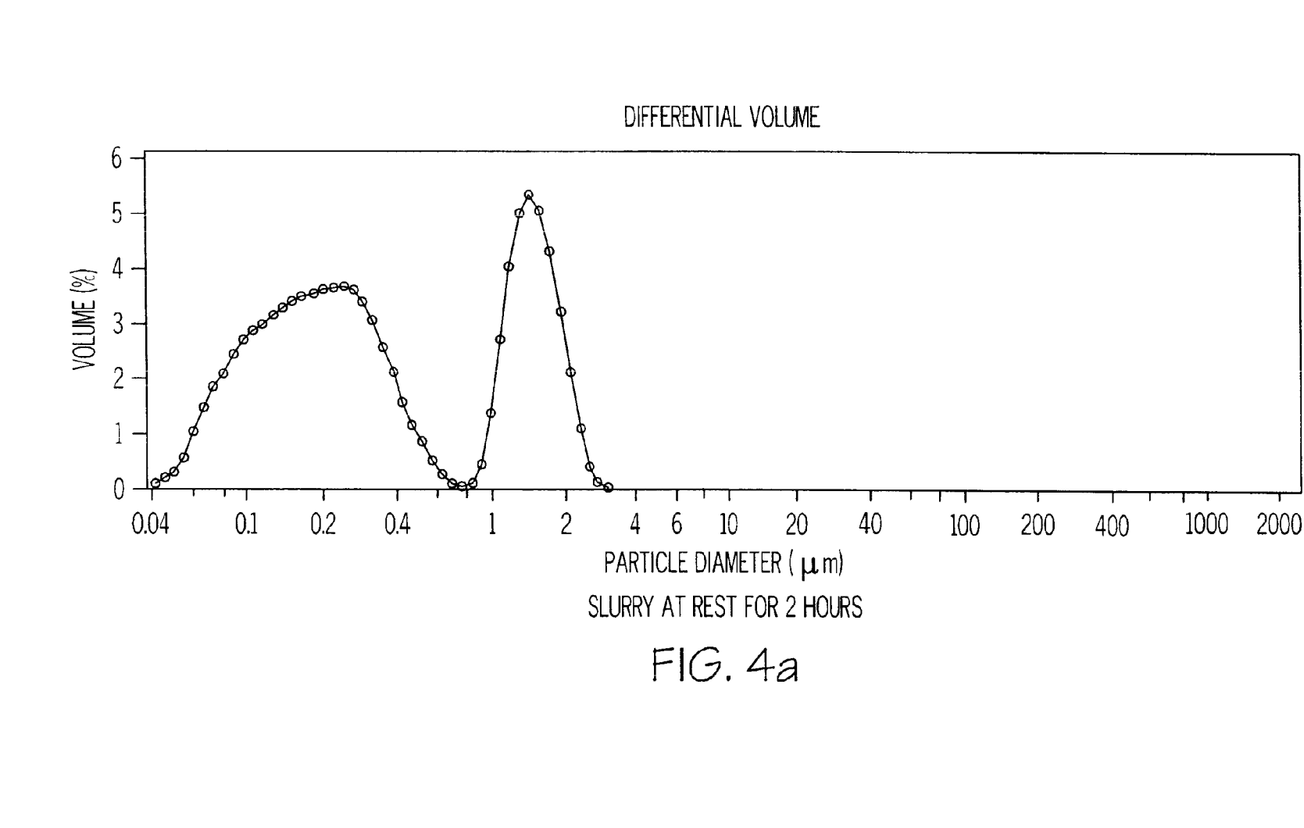
FIG. 4a is a particle size distribution for a slurry of the present invention which has been at rest and has formed stage 1 agglomerates.
Figure 4B:
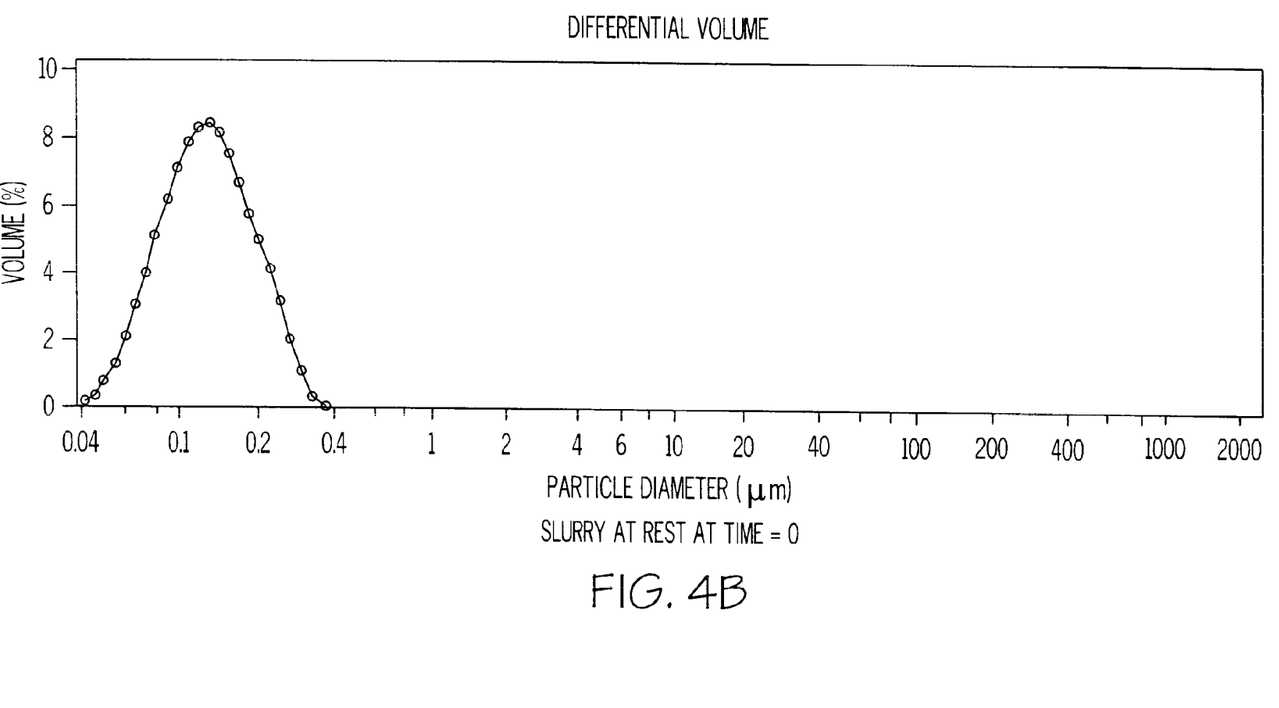
FIG. 4b is a particle size distribution for the slurry identified in FIG. 4a, wherein the stage 1 agglomerates have been de-agglomerated due to sonification.
Figure 5A:
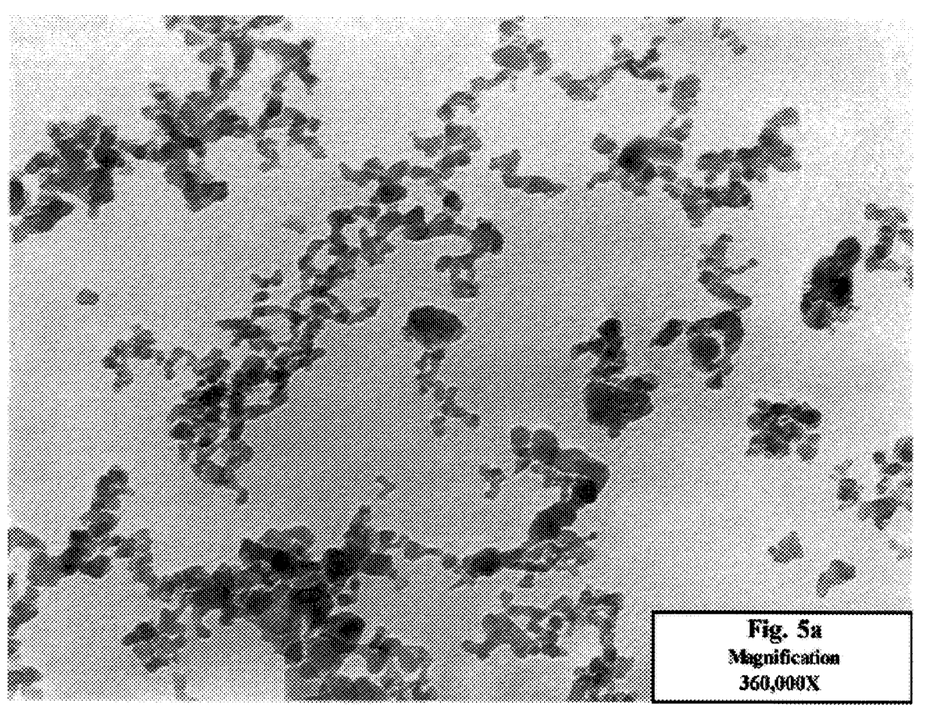
FIG. 5a is a TEM micrograph of stage 1 agglomeration.
Figure 5B:
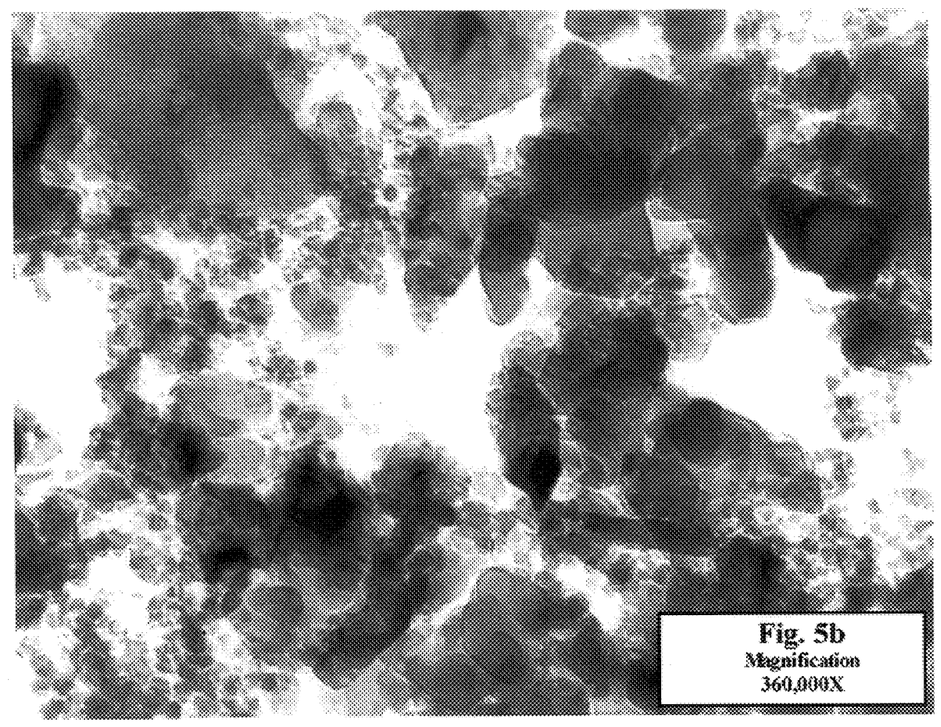
FIG. 5b is a TEM micrograph of stage 2 agglomeration.
Figure 6:
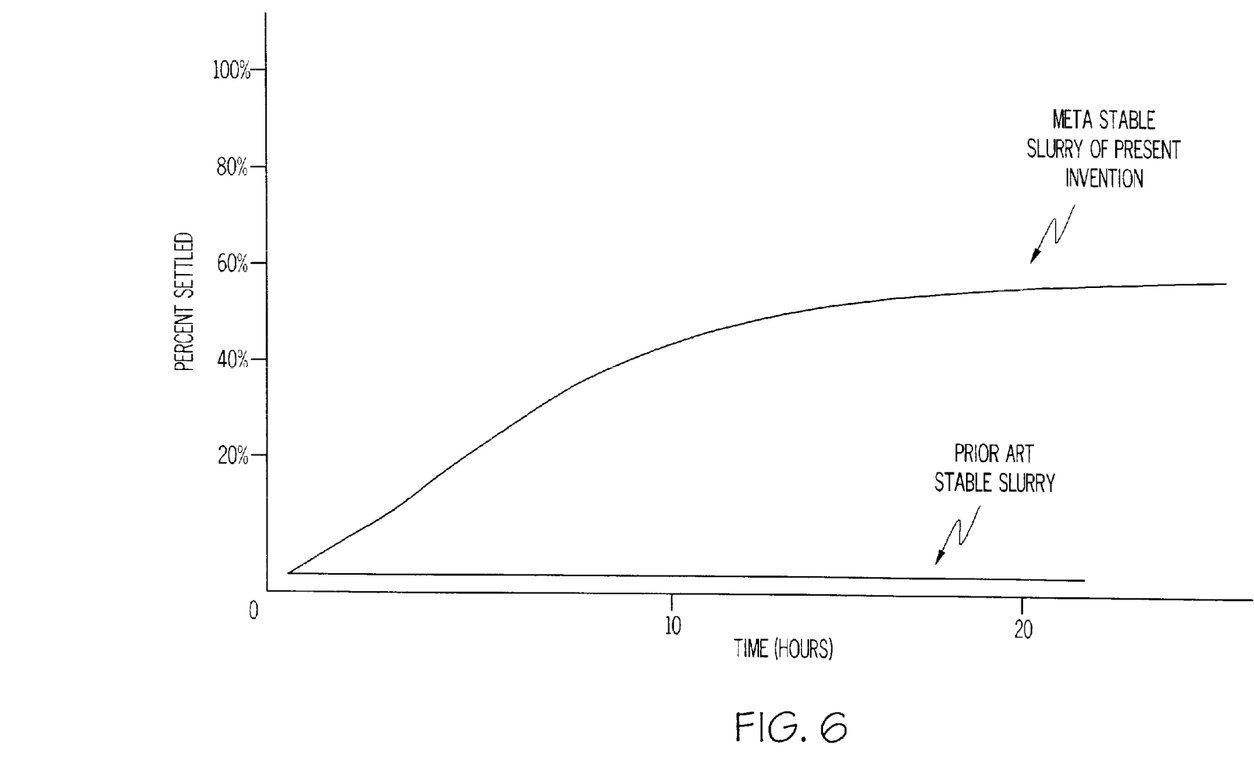
FIG. 6 is a graph which plots percent settling over time of a slurry in accordance with the present invention and provides a comparison with a stable slurry.

The ceramic (metal oxide) particles of the present invention are of a high purity and have an aggregate size distribution of less than about 1.0 micron in order to avoid scratching, pit marks, divots and other surface imperfections during the polishing. By way of example, FIGS. 4a and 4b illustrate particle size distributions for metal oxide particles of the present invention, wherein FIG. 4a shows a particle size distribution for a slurry at rest for more than 2 hours, and FIG. 4b shows a particle size distribution of the slurry illustrated in FIG. 4a, but after low energy sonification. As can be seen, low energy sonification is sufficient to break apart the (stage 1) agglomerates of the present invention.

The aggregate size of the particles refers to the measurement of the branched, three dimensional chains of fused primary particles (individual molten spheres). It should be noted that although it is common to refer to the terms "particle," "primary particle" and "aggregate particle" interchangeably, such reference is inaccurate and misleading. For example, what is typically meant by the term "particle size" is in fact the average maximum dimension of the "aggregate particle or aggregates" and not the "primary particles." Therefore, careful appreciation and differentiation of aggregates and primary particles is essential to those skilled in the art.

One method of determining the aggregate size distribution in the present invention was by transmission electron microscopy (TEM). In this method, the metal oxide particle sample is dispersed in a liquid medium until the agglomerates have been reversed to aggregates. Its concentration is then adjusted until discrete aggregates are shown on the TEM grid. Multiple fields on the grid are then imaged using an image analysis system manufactured by Kontron Instruments (Everett, Mass.) and stored on a video tape until greater than 1000 aggregates are imaged and stored. The stored images are in turn fed into an image analysis computer with a frame-grabber board for further processing, i.e. cleaning up aberrations, adjusting background and normalizing the image. Individual aggregates in the binary field are measured for a number of particle parameters, i.e. aggregate size, using known techniques such as that described in ASTM D3849-89. Measurements may be recalled individually or in the form of statistical or histogram distributions.

In order for the polishing slurry of the present invention to be an effective alternative to conventional slurries, it is important that the aggregates of the particles agglomerate when the slurry is at rest and immediately de-agglomerate when the slurry is agitated. Although the slurries of the present invention will comprise aggregates that will tend to re-agglomerate and settle out, the agglomerates will not experience substantial bridging (e.g. will not form a hard, dense sediment), and will readily re-disperse with simple stirring. In a preferred embodiment, the aggregates will agglomerate without significant bridging for at least a three month period of time.

The ceramic particles of the present invention, in addition to having an aggregate size distribution less that 1.0 micron, have an average or mean aggregate diameter of less than about 0.4 micron, and the particles of the present invention DO NOT have a force sufficient to repel and overcome the van der Waals attractive forces between the particles. The mean aggregate diameter refers to the average equivalent spherical diameter when sing TEM image analysis, i.e. based on the cross-sectional area of the aggregate. By force is meant that either the surface potential or the hydration force of the ceramic particles must NOT be sufficient to repel and overcome the van der Waals attractive forces between the particles.

In a preferred embodiment, the metal oxide particles will have a mean aggregate size distribution less than 0.3 micron and also have a maximum zeta potential greater than ±0.10 millivolts. Zeta potential (.zeta.) is the potential difference, measured in a liquid, between the shear plane and the bulk of the liquid beyond the limits of the electrical double layer. For a given ceramic (e.g., metal oxide) particle composition, the isoelectric point is defined as the pH at which zeta potential is zero. As the pH is increased or decreased away from the isoelectric point, the surface charge is increased negatively or positively, respectively. As the pH continues to increase or decrease, the surface charge will reach an asymptote, the asymptote being referred to as the maximum zeta potential. It should be noted that the maximum zeta potential and isoelectric point are functions of the metal oxide composition and that the maximum zeta potential can be effected by the addition of salts to the aqueous medium. For a more complete discussion of zeta potentials, please see R. J. Hunter, Zeta Potential in Colloid Science (Academic Press 1981).

Although zeta potential cannot be measured directly, the zeta potential can be measured by a variety of known techniques, such as electrophoresis, electrokinetic sonic amplitude, and analytical techniques including ultrasonic vibration potential. In the present invention, the zeta potential referred to was determined by measurement of the electrokinetic sonic amplitude using the Matec MBS-8000 instrument (available from Matec Applied Sciences, Inc., Hopkington, Mass.).

In another embodiment, an oxidizing component may be added to the polishing slurry to oxidize the metal layer to its corresponding oxide. For example, in the present invention, an oxidizing component is used to oxidize a metal layer to its corresponding oxide, such as tungsten to tungsten oxide. The layer is mechanically polished to remove the tungsten oxide from the layer. Although a wide range of oxidizing components may be used, preferred components include oxidizing metal salts, oxidizing metal complexes, iron salts such as nitrates, sulfates, EDTA, citrates, potassium ferricyanide and the like, aluminum salts, sodium salts, potassium salts, ammonium salts, quaternary ammonium salts, phosphonium salts, peroxides, chlorates, perchlorates, permanganates, persulfates and mixtures thereof. Typically, the oxidizing component is present in the slurry in an amount sufficient to ensure rapid oxidation of the metal layer while balancing the mechanical and chemical polishing components of the slurry. In addition, it has further been discovered that a critical relationship exists between the concentration of the oxidizing component and the colloidal stability of the polishing slurry. As such, oxidizing components are typically present in the slurry from about 0.5% to 15% by weight, and preferably in a range between 1% and 7% by weight.

In order to further increase the ionic strength of a polishing slurry, a variety of additives, such as surfactants, polymeric stabilizers or other surface active dispersing agents, can be used. Many examples of suitable surfactants for use in the present invention are disclosed in, for example, Kirk-Othmer, Encyclopedia of Chemical Technology, 3rd Edition, Vol. 22 (John Wiley & Sons, 1983); Sislet & Wood, Encyclopedia of Surface Active Agents (Chemical Publishing Co., Inc., 1964) and available manufacturing literature, including for example McCutcheon's Emulsifiers & Detergents, North American and International Edition (McCutcheon Division, The MC Publishing Co., 1991); Ash, The Condensed Encyclopedia of Surfactants (Chemical Publishing Co., Inc. 1989); Ash, What Every Chemical Technologist Wants to Know About . . . Emulsifiers and Wetting Agents, Volume I (Chemical Publishing Co., Inc. 1988); Tadros, Surfactants (Academic Press, 1984); Napper, Polymeric Stabilization of Colloidal Dispersion (Academic Press, 1983); and Rosen, Surfactants & Interfacial Phenomena, 2nd edition (John Wiley & Sons, 1989), all of which are incorporated herein by reference. In one embodiment, a surfactant consisting of a copolymer of polydimethyl siloxane and polyoxyalkylene ether was found to be suitable.

In general, the amount of an additive used, such as a surfactant, in the present invention should be sufficient to achieve effective steric stabilization of the slurry and will typically vary depending on the particular surfactant selected and the nature of the surface of the metal oxide particle. For example, if not enough of a selected surfactant is used, it will have little or no effect on stabilization. On the other hand, too much of the surfactant may result in undesirable foaming and/or flocculation in the slurry. As a result, additives like surfactants should generally be present in a range between about 0.001% and 10% by weight. Furthermore, the additive may be added directly to the slurry or treated onto the surface of the metal oxide particle utilizing known techniques. In either case, the amount of additive is adjusted to achieve the desired concentration in the polishing slurry.

The metal oxide particles of the present invention are typically precipitated aluminas, filmed silicas or filmed aluminas and preferably are filmed silicas or fumed aluminas. The production of filmed silicas and aluminas is a well-documented process which involves the hydrolysis of suitable feedstock vapor, such as silicon tetrachloride or aluminum chloride, in a flame of hydrogen and oxygen. Molten particles of roughly spherical shapes are formed in the combustion process, the diameters of which are varied through process parameters. These molten spheres of filmed silica or alumina, typically referred to as primary particles, fuse with one another by undergoing collisions at their contact points to form branched, three dimensional chain-like aggregates. The force necessary to break aggregates is considerable and often considered irreversible. During cooling and collecting, the aggregates undergo farther collision that may result in some mechanical entanglement to form (preferably stage 1) agglomerates.

The precipitated metal oxide particles may be manufactured utilizing conventional techniques and are typically formed by the coagulation of the desired particles from an aqueous medium under the influence of high salt concentrations, acids or other coagulants. The particles are filtered, washed, dried and separated from residues of other reaction products by conventional techniques known to those skilled in the art.

In a preferred embodiment, once produced, the metal oxide is slowly added to deionized water to form a colloidal dispersion. The slurry is completed by subjecting the dispersion to high shear mixing using conventional techniques. The pH of the slurry is adjusted away from the isoelectric point to maximize colloidal stability. The polishing slurry of the present invention may be used as a one package system (metal oxide particles and oxidizing component, if desired, in a stable aqueous medium) or two package system (the first package consists of the metal oxide particles in a stable aqueous medium and the second package consists of oxidizing component) with any standard polishing equipment appropriate for use on the desired metal layer of the wafer. The two package system can be used when an oxidizing component decomposes or hydrolyses in the presence of certain metal oxide particles over time. In the two package system, the oxidizing component may be added to the slurry just prior to polishing.

The polishing slurry of the present invention has been found useful in providing effective polishing to metal layers at desired polishing rates while minimizing surface imperfections and defects. Non-limiting illustrations of the polishing slurry of the present invention follow.

Although the metal oxide particles have been directed to aluminas and silicas, it is understood that the teachings herein have applicability to other fine metal oxide particles such as germania, ceria, titania and the like. Furthermore, the metal oxide particles may be utilized to polish other metal surfaces such as copper, aluminum and titanium, as well as underlayers such as titanium, titanium nitride and alloys of titanium/tungsten.

It is further understood that the present invention is not limited to the particular embodiments shown and described herein, but that various changes and modifications maybe made without departing from the scope and spirit of the invention.

What is claimed is:

1. A method for chemical-mechanical polishing a metal layer of a substrate, the method which comprises the steps of:
   a) providing a chemical mechanical polishing slurry comprising particles dispersible in an aqueous medium, said aqueous medium having a static etch rate with respect to the metal layer of less than about 75 Angstroms per minute, said slurry particles having a surface area ranging from about 40 $m^2/g$ to about 430 $m^2/g$, an aggregate size distribution less than about 1.0 micron, a mean aggregate diameter less than about 0.4 micron and said slurry comprising an amount of at least one ionic species which is sufficient to prevent a force sufficient to repel and overcome van der Waals forces between the particles, wherein said slurry particles are able to readily form agglomerates of greater than 0.75 microns and said agglomerates being stable stage 1 agglomerates; and
   b) chemical mechanical polishing a metal layer on a semiconductor substrate with said slurry.

2. A method in accordance with claim 1 wherein the slurry particles have a diminished electrostatic layer due to the ionic species in the slurry, said ionic species being present in an amount greater than about 0.001 molar.

3. A method in accordance with claim 2, wherein the ionic species comprises a surfactant, an electrolyte or combinations thereof.

4. A method in accordance with claim 1 further comprising the step of lowering the ionic strength of any slurry remaining on the polished metal layer on a semiconductor substrate after polishing, and thereby inducing an increased electrostatic layer around the particles, and making the polished substrate easier to clean.

5. A method in accordance with claim 1, wherein once the slurry is agitated to create a uniform dispersion of particles and then placed at rest, particle agglomeration of greater than 1 micron will occur within 2 hours.

6. A method in accordance with claim 1, wherein said slurry provides a static etch rate of the metal of less than 50 Angstroms per minute.

7. A method in accordance with claim 1, wherein said slurry provides a static etch rate of the metal of less than 40 Angstroms per minute.

8. A method in accordance with claim 1, wherein said slurry provides a static etch rate of the metal of less than 30 Angstroms per minute.

9. A method in accordance with claim 1, wherein said slurry provides a static etch rate of the metal of less than 20 Angstroms per minute.

10. A method in accordance with claim 1, wherein said slurry provides a static etch rate of the metal of less than 10 Angstroms per minute.

11. A method in accordance with claim 1, wherein the particles comprise alumina and titania.

12. The method of claim 1 wherein said particles have a maximum zeta potential greater than about ±1.0 millivolts.

13. The method of claim 1 wherein said slurry further comprises an oxidizing component.

14. The method of claim 13 wherein said oxidizing component is selected from a group consisting of: iron salts, aluminum salts, sodium salts, potassium salts, ammonium salts, quaternary ammonium salts, phosphonium salts, peroxides, chlorates, perchlorates, permanganates, persulfates and mixtures thereof.

15. The method of claim 1 wherein said slurry further comprises a surfactant or an electrolyte.

16. The method of claim 1 wherein the slurry comprises a surfactant selected from a group consisting of nonionic surfactants, anionic surfactants, cationic surfactants, amphoteric surfactants and mixtures thereof.

17. The method of claim 16 wherein said surfactant is selected from a group consisting of: siloxanes, including organo-siloxanes, polyoxyalkylene ethers, and mixtures and copolymers thereof.

18. A chemical-mechanical polishing slurry for polishing a metal layer comprising:
   particles uniformly dispersed in an aqueous medium having a surface area ranging from about 40 $m^2/g$ to about 430 $m^2/g$, an aggregate size distribution less than about 1.0 micron, a mean aggregate diameter less than about 0.4 micron and comprising an amount of at least one ionic species which is sufficient to prevent a force sufficient to repel and overcome van der Waals forces between the particles, wherein said slurry particles are able to readily form stage 1 agglomerates of greater than 1 micron.

19. A slurry in accordance with claim 18 wherein said particles are present in a range between about 0.5% and 55% by weight.

20. A slurry in accordance with claim 18 wherein said particles have a surface area less than about 70 $m^2/g$ and are present in said slurry in a range less than about 10% by weight.

21. A slurry in accordance with claim 18 wherein said particles have a surface area ranging between about 70 $m^2/g$ to about 170 $m^2/g$ and are present within said slurry in a range less than about 15% by weight.

22. A slurry in accordance with claim 20 wherein said particle is an alumina, silica, titania or mixtures thereof.

23. A slurry in accordance with claim 18 wherein said particles have a maximum zeta potential greater than about ±1.0 millivolts.

24. A slurry in accordance with claim 18 wherein said slurry further comprises an electrolyte a surfactant or a mixture thereof.

25. A slurry in accordance with claim 18 wherein the slurry comprises a surfactant selected from the group consisting of: nonionic surfactants, anionic surfactants, cationic surfactants, amphoteric surfactants and mixtures thereof.

26. A slurry in accordance with claim 18 wherein the slurry particles consist essentially of alumina.

27. A slurry in accordance with claim 18 wherein the slurry particles consist essentially of silica.

28. A slurry in accordance with claim 18 wherein the slurry particles comprise titania or mixtures of titania and a plurality of at least one other ceramic particle.

29. A slurry in accordance with claim 18 wherein the slurry comprises less than 100 part per million iron ions.

30. A slurry in accordance with claim 18 wherein after the slurry is at rest for 24 hours, a particle size distribution analysis based upon volume percentages will show a multimodal distribution.

31. A slurry in accordance with claim 21 wherein said particle is an alumina, silica, titania or mixtures thereof.

* * * * *